Patented Dec. 23, 1947

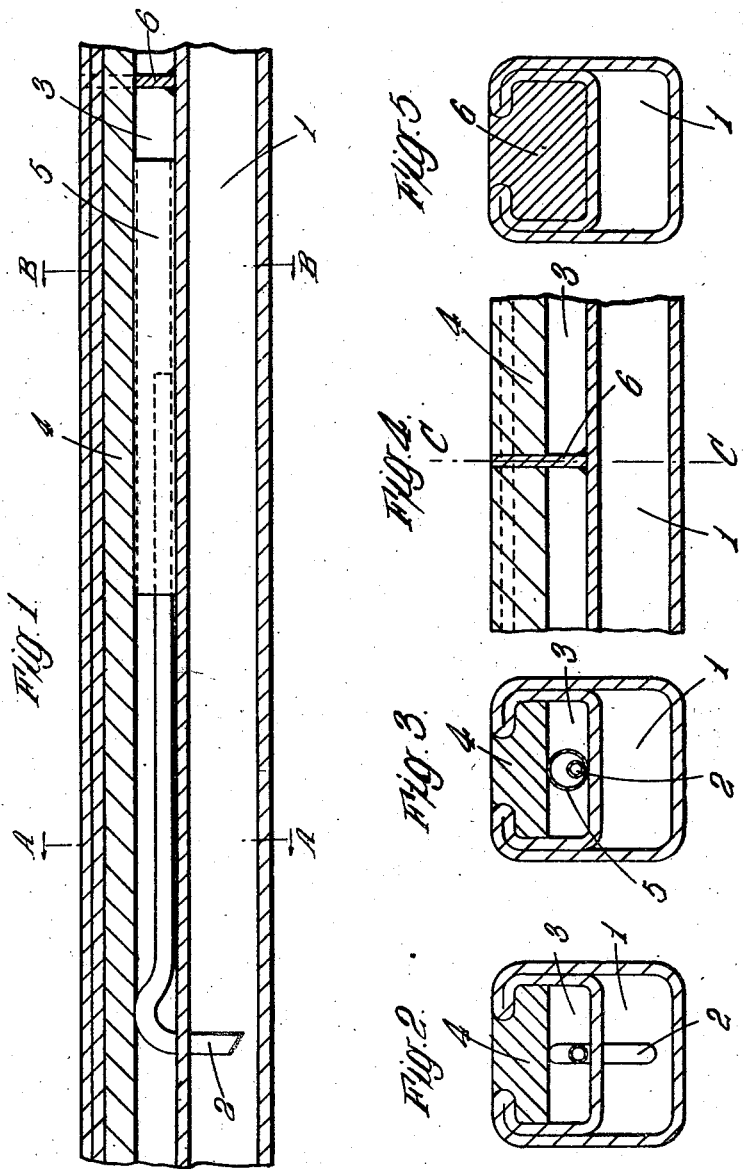

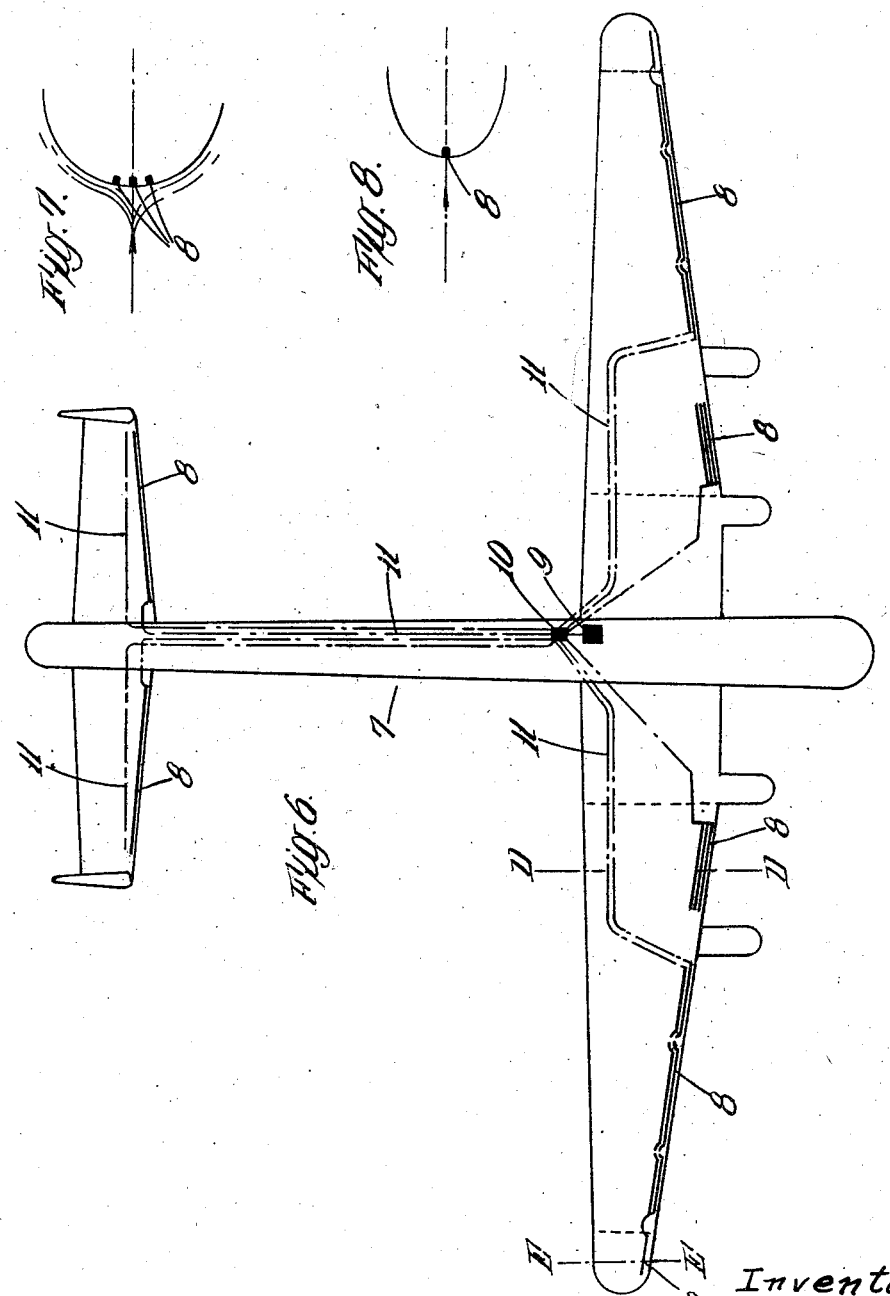

2,433,214

UNITED STATES PATENT OFFICE 2,433,214

PREVENTION OF ICE FORMATION ON AIRCRAFT

Joseph Halbert and Ronald Rawson Rawson, Haltwhistle, England, assignors to Sheepbridge Stokes Centrifugal Castings Company Limited, Chesterfield, England, a British company Application March 17, 1943, Serial No. 479,510
In Great Britain August 11, 1942

11 Claims. (Cl. 244—134)

This invention relates to means for preventing the formation of ice on aircraft.

Various means have been proposed for the prevention of ice formation on aircraft, including the use of anti-freezing liquids such as ethylene glycol, but none of these has been entirely satisfactory owing to difficulties in distributing the liquid in a satisfactory manner, bearing in mind the fact that it is not possible, or at any rate practicable, to transport very large quantities of liquid on the aircraft.

The problem of distributing small quantities of liquids in equal controlled amounts over anything but short distances has always been difficult.

To cause liquid to travel in a pipe a pressure head is required which increases as the distance to be travelled increases. If the area for the passage of the liquid can be made sufficiently large in comparison with the quantity of liquid flowing, this pressure can be made very small. In practice space is always limited for one reason or another. Thus the distribution orifices of whatever form they be, must have sufficient resistance to flow that the required amount of liquid per orifice will give a sufficiently high pressure, that the pressure drop necessary to pass the liquid to the further distribution orifices will be only a small percentage of the total pressure and thus not allow too great a flow from the nearer orifices.

Another difficulty arises when the smallness of the flows requires very fine orifices. This can be seen when it is realised that a single $\frac{1}{32}$ of an inch hole through a plate $\frac{1}{16}$ of an inch thick will, at a pressure of only 2 lbs./sq. in., have many times the flow required for delivery over a length of from 10 to 15 feet. Thus the drilling of fine holes in lengths of pipe is impossible. Fin slots also would have to be of such width that impossible tolerances would have to be worked to. Thus the difficulty has usually been overcome by using various porous media, which have a porosity to give the required pressure. The fineness of the holes necessary is always a source of weakness owing to choking by dust. Even when such materials as porous metals are used, which do not deteriorate with time in the ordinary way, a pressure rise with time occurs with many liquids desirable for use as de-icing media, due to the very minute holes or pores present. This rise of pressure only occurs when the holes through which the liquid has to pass are of minute area and does not occur in holes of larger diameter.

The problem is solved according to the present invention by dividing it into two parts, which is effected by first dividing the flow of liquid so as to obtain distribution to a reasonable number of parts, and then obtaining the final spreading over to the surface to be protected, by means of a porous material.

Accordingly, the present invention provides means for preventing the formation of ice on aircraft comprising back pressure-producing tubes, means for supplying an anti-freezing liquid thereto, said tubes communicating with a chamber which is in contact with a porous material, which is adapted to be mounted adjacent that part of the aircraft which it is desired to protect from the formation of ice.

The necessary pressure may be provided by a pump, but other means for producing pressure such as a gravity feed may be used if desired, or the liquid may be stored in a convenient reservoir under pressure and released as desired.

The porous material is preferably a mass of porous metal but other porous material such as wicking, cotton fabrics such as cotton duck, linen, porous rubber, porous synthetic resinous masses, porous glass, porcelain, volcanic and artificial stone, porous wood, metal gauze, fibrous materials, chalk, or glass fibres covered by a wire mesh screen may be used.

The invention will now be further described by way of example with reference to the accompanying drawings, in which:

Figure 1 is a sectional view of an apparatus according to the invention;

Fig. 2 is a section on line A—A of Fig. 1;

Fig. 3 is a section on line B—B of Fig. 1;

Fig. 4 is a view of a detail showing one of the dams;

Fig. 5 is a section on line C—C of Fig. 4;

Fig. 6 is a plan view showing the apparatus according to the invention fitted to an aircraft;

Fig. 7 is a sectional view taken on line D—D of Fig. 6, and

Fig. 8 is a sectional view taken on line E—E of Fig. 6.

According to the invention the means for preventing the formation of ice on aircraft comprises a channel-shaped metal member the outer part of which is filled with a mass of porous metal, a chamber being formed between the lower surface of the porous metal and the bottom and lower sides of the channel-shaped member and a plurality of flow resisting tubes projecting through the bottom of the chamber through which the anti-freezing liquid is supplied.

Preferably dams are provided at intervals along the chamber. The spacing of these dams depends upon the pressure resistance through the porous metal, the viscosity of the anti-freezing liquid and the angle of the wing slope (in the case in which a wing surface is being de-iced). The higher the resistance of the porous metal the smaller will be the number of dams required and also the greater the viscosity of the anti-freezing liquid the smaller will be the number of dams required. The greater the angle of the wing slope the greater is the number of the dams required.

Preferably also a larger bore tube is fitted over the end of the back pressure-producing tubes. This serves to prevent the back pressure-producing tubes from being blocked up during manufacture and also helps to increase the number of points in the chamber to which the anti-freezing liquid is positively led.

The porous metal must be securely attached and is preferably bonded to the channel-shaped metal member. This may be effected, for example, by soldering or brazing, riveting or screwing, or by forming the mass of porous metal on the channel-shaped metal member as by sintering in such a way that bonding takes place.

The tubes on entering the chamber are preferably bent at right angles and should have a bore of between 0.002 and 0.050 of an inch, preferably between 0.008 and 0.025 of an inch.

The anti-freezing liquid which passes into the chamber seeps through the mass of porous metal which is disposed at or adjacent that part of the aircraft which it is desired to protect from ice formation.

The mass of porous metal is conveniently made from a metal powder by the processes known in the art of powder metallurgy. In choosing a metal for the porous metal mass consideration should be given to the factors of resistance to atmospheric corrosion and corrosion by the anti-freezing liquid, and also the factors of mechanical strength and resistance to vibration.

Referring to Figs. 1 to 5 of the drawings, anti-freezing liquid is supplied by a pump (not shown) to the chamber 1 which is provided with a plurality of tubes 2 each of about 0.017 of an inch bore which introduce the anti-freezing liquid into the chamber 3 in close proximity to the mass of porous metal 4 through which the liquid seeps to that part of the aircraft which is to be protected. The end of the tube 2 is surrounded by a tube 5 and dams 6 are provided at about 12 inch intervals. The pump gives a constant delivery of liquid and, as this quantity has to pass through a given number of the small bore tubes 2 and a given pressure is needed to do this, the pump, being of constant delivery type, will produce this pressure in the system. Thus, while it may not be strictly correct to say that the small bore tubes "produced the pressure," their presence in the system is responsible for the pump producing the pressure.

The purpose of providing the tube 5 is for convenience of manufacture. Its object is to cover the outlet of the small bore tube and prevent the powders from entering it and blocking it before sintering takes place. The bore of the tube is so great, that for the low flows needed, the pressure drop is negligible; in fact the pressure difference in inches head of liquid for equal flow in a 1" and 10" length cannot be read visually without considerable magnification.

For this example of a tube of 0.017 of an inch bore, the length of the tube is 3" and this supplies 3" of porous metal. The figures will vary corresponding with variation in the bore of the tube. Thus, for example, for tubes of bores between 0.014 and 0.018, the tube length varies between 2 inches and 3½ inches. The tube 5 varies from 1 to 3 inches in length and the bore is ⅛".

Referring now to Figs. 6 to 8 of the drawings, these illustrate the apparatus of the invention fitted to an aircraft. At various leading edges of the aircraft indicated generally by the reference numeral 7 there are fitted a number of units 8 comprising a mass of porous metal, and means for supplying an anti-freezing liquid thereto such as that illustrated in Figs. 1 to 5 of the drawings. It will be seen that in some cases a plurality of such units are employed. The anti-freezing liquid is contained in a tank 9 and is distributed to the various units 8 by the pump 10 and the feed pipes 11. The division of the unit near the tip into sections, as shown in Fig. 6, has the following purposes:

(1) to simplify manufacture and handling, by not having too long a length of distributor to deal with, and (2) to prevent difficult alteration in the construction of the wing, which the presence of a groove to take the distribution would make necessary at certain points, if it had to be carried straight through.

It will be understood that the expression "metal" as used herein includes alloys, and among metals which are suitable as constituents of the porous metal mass are nickel, nickel-copper alloys, copper-nickel-tin alloys, copper-nickel-antimony alloys and stainless steel.

By varying the size of the pores and the degree of porosity it will be possible to vary the pressure at which the anti-freezing liquid is supplied to the surface which it is desired to protect.

Thus the porous metal used should have a solid content of between 30 and 80%, i. e. between 70 and 20% of voids. The pores are of the continuous type and can be formed by the use of a volatile substance such as "Sterotex" (a vegetable shortening) or salicylic acid or stearine, which form a gas or vapour during sintering. The powders and the volatile substance are mixed uniformly and when in place in the channel member during sintering, gas or vapour will be evolved and will flow upwards. Porosity can be varied by using different shapes and sizes of powder. A spherical copper powder made by one process gave an entirely different flow to an electrolytic copper powder made by another. By adjusting the shape and the limits of the size of the powders used it is possible to adjust the pressure produced by the flow required. It was found that the greater the range of particle size the higher is the pressure required to give equal flow and vice-versa. Also the larger the particle size within a given range the lower is the pressure necessary. By using a larger grain size lower melting point powder in admixture with any given particle of higher melting point powder it was found that a smaller number of large pores could be obtained, for example by using copper and nickel powders of 400 mesh and tin powder of between 100 and 200 mesh.

In general, the anti-freezing liquid will be supplied by pumping and a multiple delivery pump which is capable of working up to a pressure of 400 lbs./sq. in. and has a plurality of separate delivery outlets which will give constant output against varying pressures is suitable. The flow to any outlet can be adjusted as desired and will remain constant when once set. To ensure the correct distribution throughout the delivery system shown in Fig. 6 of the drawings, it is necessary to provide for a certain amount of pressure drop through the porous metal so as to give a uniform flow in the spaces between the dams. At the highest temperature at which ice will form, i. e. 0° C., it is advisable to employ the lowest pressure which will give distribution, since with the lowering of the temperature to −40° C., the viscosity of the anti-freezing liquid is much higher and the liquid requires greater pressure to pump it over the system. At the same time it must be seen that there is sufficient pressure at day temperature, e. g. 15° C., to get sufficient distribution to allow checking up of the system on the ground. The increase in viscosity of anti-freezing liquids between the temperature of 15° C. and −40° C. may be anything from 20 to 40 or even more. This means that with a pump pressure of 3 lbs./sq. in. at 15° C. a pressure of 60 to 120 lbs./sq. in. is necessary at −40° C. The normal practice will be to set the pump at the correct flow and allow it to continue to run.

The means according to the present invention is applicable to the protection of any part of the aircraft which is subject to the formation of ice. Thus, for example, it may be used on the leading edges of wings, air screws, radio masts, carburettor, induction system, wind screens and the retractable under-carriage.

The expression "back pressure - producing tubes" used in the claims is defined as small bore tubes connecting the conduit with the chamber, of such bore and length as to act as a metering or control device for the quantity of liquid which it is desired to admit.

We claim:

1. An aeronautical structural element disposed at the leading edge of an airfoil of aircraft comprising a series of chambers having wall portions of rigid porous material the outer surfaces of which wall portions are mounted adjacent that part of the aircraft which it is desired to protect from the formation of ice, a conduit substantially co-extensive with said series of chambers for conveying fluid under pressure, and flow resisting tubes connecting said conduit with said chambers the porosity of said porous material being such that in the absence of said flow resisting tubes the fluid would not reach all said chambers.

2. An aeronautical structural element disposed at the leading edge of an airfoil of aircraft comprising a series of chambers having wall portions of rigid porous metal the outer surfaces of which wall portions are mounted adjacent that part of the aircraft which it is desired to protect from the formation of ice, a conduit substantially co-extensive with said series of chambers for conveying fluid under pressure, and flow resisting tubes connecting said conduit with said chambers the porosity of said porous material being such that in the absence of said flow resisting tubes the fluid would not reach all said chambers.

3. An aeronautical structural element disposed at the leading edge of an airfoil of aircraft comprising a series of chambers having wall portions of rigid porous material the outer surfaces of which wall portions are mounted adjacent that part of the aircraft which it is desired to protect from the formation of ice, a conduit substantially co-extensive with said series of chambers for conveying fluid under pressure, and flow resisting tubes connecting said conduit with said chambers, the bore of said flow resisting tubes being small relative to the dimensions of the chambers the porosity of said porous material being such that in the absence of said flow resisting tubes the fluid would not reach all said chambers.

4. An aeronautical structural element disposed at the leading edge of an airfoil of aircraft comprising a series of chambers having wall portions of rigid porous material the outer surfaces of which wall portions are mounted adjacent that part of the aircraft which it is desired to protect from the formation of ice, a conduit substantially co-extensive with said series of chambers for conveying fluid under pressure, flow resisting tubes connecting said conduit with said chambers and tubes disposed around the ends of said back flow resisting tubes the porosity of said porous material being such that in the absence of said flow resisting tubes the fluid would not reach all said chambers.

5. An aeronautical structural element disposed at the leading edge of an airfoil of aircraft comprising a series of chambers having wall portions of rigid porous material the outer surfaces of which wall portions are mounted adjacent that part of the aircraft which is desired to protect from the formation of ice, partitions disposed in said chambers, a conduit substantially co-extensive with said series of chambers for conveying fluid under pressure, and flow resisting tubes connecting said conduit with said chambers, the bore of said flow resisting tubes being small relative to the dimensions of the chambers the porosity of said porous material being such that in the absence of said flow resisting tubes the fluid would not reach all said chambers.

6. An aeronautical structural element disposed at the leading edge of an airfoil of aircraft comprising a series of chambers having wall portions of rigid porous metal the outer surfaces of which wall portions are mounted adjacent that part of the aircraft which it is desired to protect from the formation of ice, said chambers each being formed from a channel-shaped metal member the outer part of which is filled with a mass of rigid porous metal, the chamber being formed between the lower surface of the porous metal and the bottom and lower sides of the channel-shaped member, a conduit substantially co-extensive with said series of chambers for conveying fluid under pressure and flow resisting tubes connecting said conduit with said chambers the porosity of said porous material being such that in the absence of said flow resisting tubes the fluid would not reach all said chambers.

7. In a system for distributing fluid over an extended surface, a series of chambers having wall portions of rigid porous material the outer surfaces of which wall portions constitute the surface to which said fluid is to be delivered, a conduit substantially co-extensive with said series of chambers for conveying fluid under pressure, and flow resisting tubes connecting said conduit with said chambers the porosity of said porous material being such that in the absence of said flow resisting tubes the fluid would not reach all said chambers.

8. In a system for distributing fluid over an extended surface, a series of chambers having wall portions of porous metallic material the outer surfaces of which wall portions constitute the surface to which said fluid is to be delivered, a conduit substantially co-extensive with said series of chambers for conveying fluid under pressure, and flow resisting tubes connecting said conduit with said chambers the porosity of said porous material being such that in the absence of said flow resisting tubes the fluid would not reach all said chambers.

9. In a system for distributing fluid over an extended surface, a chamber for fluid under pressure, a series of further chambers each having a portion of the wall thereof formed of rigid porous material the outer surfaces of said wall portions each forming part of the said extended surface, flow resisting tubes establishing communication between said first chamber and said further chambers severally, and tubes larger than said flow resisting tubes surrounding the discharge ends of said flow resisting tubes and serving to disperse fluid in said further chambers the porosity of said porous material being such that in the absence of said flow resisting tubes the fluid would not reach all said chambers.

10. In a system for distributing fluid over an extended surface, a structure comprising a conduit and a channel paralleling the conduit, rigid porous material filling the outer portion of said channel the outer surface of which material forms the surface to which said fluid is to be distributed, partitions dividing the channel into chambers, and flow resisting tubes leading from the conduit into said chambers severally the porosity of said porous material being such that in the absence of said flow resisting tubes the fluid would not reach all said chambers.

11. In a system for distributing a small flow of fluid uniformly over a relatively large surface, a chamber for receiving fluid under pressure in excess of that permissible at the distribution surface, a second chamber having a portion of the wall thereof formed of rigid porous material, the outer surface of said material forming the surface to which the fluid is to be distributed, means dividing said second chamber into compartments, and flow resisting tubes establishing communication between said first chamber and the compartments of said second chamber severally, the bores and lengths of said tubes being such as to reduce the fluid pressure at the porous material to the desired extent the porosity of said porous material being such that in the absence of said flow resisting tubes the fluid would not reach all said chambers.

JOSEPH HALBERT.
RONALD RAWSON RAWSON.

REFERENCES CITED

The following references are of record in the file of this patent:

UNITED STATES PATENTS

| Number | Name | Date |
| --- | --- | --- |
| 1,129,977 | Hagny | Mar. 2, 1915 |
| 1,687,780 | Neal | Oct. 16, 1928 |
| 1,732,579 | Gleason | Oct. 22, 1929 |
| 2,075,659 | Ramsbottom et al. | Mar. 30, 1937 |
| 2,097,926 | Kimball | Nov. 2, 1937 |
| 2,147,678 | Smith | Feb. 21, 1939 |
| 2,155,592 | Hardy | Apr. 25, 1939 |
| 2,249,940 | Bulloch | July 22, 1941 |
| 2,372,581 | Jones | Mar. 27, 1945 |